US008817647B2

(12) United States Patent
Liao et al.

(10) Patent No.: US 8,817,647 B2
(45) Date of Patent: Aug. 26, 2014

(54) PRIORITY RULES OF PERIODIC CSI REPORTING IN CARRIER AGGREGATION

(75) Inventors: Pei-Kai Liao, Nantou County (TW); Chih-Yuan Lin, Yilan County (TW)

(73) Assignee: Mediatek Inc. (TW)

( * ) Notice: Subject to any disclaimer, the term of this patent is extended or adjusted under 35 U.S.C. 154(b) by 31 days.

(21) Appl. No.: 13/396,562

(22) Filed: Feb. 14, 2012

(65) Prior Publication Data

US 2012/0207047 A1    Aug. 16, 2012

Related U.S. Application Data

(60) Provisional application No. 61/442,825, filed on Feb. 15, 2011.

(51) Int. Cl.
  *H04L 1/00*    (2006.01)
(52) U.S. Cl.
  USPC ..................................... 370/252; 455/422.1
(58) Field of Classification Search
  USPC ..................................... 370/252; 455/422.1
  See application file for complete search history.

(56) References Cited

U.S. PATENT DOCUMENTS

| | | | | |
|---|---|---|---|---|
| 2009/0147869 | A1 | 6/2009 | Duan et al. | 375/260 |
| 2009/0209261 | A1 | 8/2009 | Kuri et al. | 455/450 |
| 2010/0296472 | A1 | 11/2010 | Lee et al. | 370/329 |
| 2012/0076028 | A1* | 3/2012 | Ko et al. | 370/252 |
| 2012/0140649 | A1* | 6/2012 | Choudhury et al. | 370/252 |
| 2012/0140708 | A1* | 6/2012 | Choudhury et al. | 370/328 |
| 2012/0220286 | A1* | 8/2012 | Chen et al. | 455/422.1 |
| 2013/0094392 | A1* | 4/2013 | Kim et al. | 370/252 |
| 2013/0114554 | A1* | 5/2013 | Yang et al. | 370/329 |
| 2013/0128813 | A1* | 5/2013 | Yang et al. | 370/328 |
| 2013/0148613 | A1* | 6/2013 | Han et al. | 370/329 |
| 2013/0188591 | A1* | 7/2013 | Ko et al. | 370/329 |
| 2013/0279460 | A1* | 10/2013 | Kim et al. | 370/329 |

FOREIGN PATENT DOCUMENTS

| | | |
|---|---|---|
| CN | 101233774 A | 8/2005 |
| CN | 101268709 A | 8/2005 |
| CN | 101917260 A | 12/2010 |
| WO | WO2009/096698 A2 | 1/2008 |
| WO | WO2010147416 A2 | 12/2010 |

OTHER PUBLICATIONS

International Search Report and Written Opinion of International Search Authority for PCT/CN2012/071175 dated May 24, 2012 (11 pages).

(Continued)

*Primary Examiner* — Hassan Kizou
*Assistant Examiner* — Deepa Belur
(74) *Attorney, Agent, or Firm* — Zheng Jin

(57) ABSTRACT

A method of determining priority rules for periodic CSI reporting in carrier aggregation is proposed. A UE obtains channel state information (CSI) feedback for multiple downlink component carriers (CCs) in a multi-carrier wireless communication network. Each downlink CC is associated with a feedback mode, and each feedback mode comprises a set of feedback types to be reported to a base station at time slots configured by an upper layer. The UE then determines a prioritized downlink CC for CSI reporting based on priority levels of the feedback types to be transmitted for each downlink CC at a given time slot. The UE then transmits the corresponding CSI feedback for the prioritized downlink CC at the given time slot via a feedback channel over a primary uplink CC. In one embodiment, different feedback types are prioritized by groups, and each group has several feedback types sharing the same priority.

22 Claims, 6 Drawing Sheets

| PRIORITY RULE | EXAMPLE 1 | EXAMPLE 2 |
|---|---|---|
| STEP 1 | FEEDBACK TYPE GROUP 1:<br>TYPE 6, 5, 3 AND 2A<br>FEEDBACK TYPE GROUP 2:<br>TYPE 2/2B/2C, TYPE 4<br>FEEDBACK TYPE GROUP 3:<br>TYPE 1A, TYPE 1<br>- PRIORITY ORDER:<br>TYPE GROUP 1 > TYPE GROUP 2 > TYPE GROUP 3 | FEEDBACK TYPE GROUP 1:<br>TYPE 6, 5, 3 AND 2A<br>FEEDBACK TYPE GROUP 2:<br>TYPE 2/2B/2C, TYPE 4<br>FEEDBACK TYPE GROUP 3:<br>TYPE 1A, TYPE 1<br>- PRIORITY ORDER:<br>TYPE GROUP 1 > TYPE GROUP 2 > TYPE GROUP 3 |
| STEP 2 | FEEDBACK MODE GROUP 1:<br>MODE 1-0, MODE 1-1<br>FEEDBACK MODE GROUP 2:<br>MODE 2-0, MODE 2-1<br>- PRIORITY ORDER:<br>MODE GROUP 1 > MODE GROUP 2 | NONE |
| STEP 3 | FOLLOW DL CC PRIORITY CONFIGURED BY RRC<br>1. VIA EXPLICIT SIGNALING<br>2. VIA IMPLICIT PRE-DEFINITION | FOLLOW DL CC PRIORITY CONFIGURED BY RRC<br>1. VIA EXPLICIT SIGNALING<br>2. VIA IMPLICIT PRE-DEFINITION |

(56) References Cited

OTHER PUBLICATIONS

TSG RAN WG1, "LS for periodic CQI/PMI/RI reporting priority", 3GPP TSG-RAN WG1 63bis, R1-110593, Jan. 17-21, 2011, see sections 1,2,4.
3GPP, TS 36.331 V9.5.0,"Technical Specification Group Radio Access Network; Evolved Universal Terrestrial Radio Access (E-UTRA); Radio Resource Control (RRC); Protocol specification (Release 9)", Dec. 2010, The whole document.
Taiwan IPO, Office Action for TW patent application 101104842 dated Apr. 2, 2014 (6 pages).
JPO office action of JP patent application 2013-552094 dated Jun. 10, 2014 (4 pages).
R1-105888, 3GPP RAN WG1 #63, Texas Instruments, Periodic CSI Reporting for Carrier Aggregation, Jacksonville, USA, Nov. 15-19, 2010 (4 pages).
R1-110138, 3GPP TSG-RAN WG1 #63bis, MediaTek Inc., Views on Periodic PMI/CQI/RI Feedback in Carrier Aggregation, Dublin, Ireland, Jan. 17-19, 2011 (3 pages).
3GPP TS 36.213 V10.0.1 (Dec. 2010), 3rd Generation Partnership Project; Technical Specification Group Radio Access Network; Evolved Universal terrestrial Radio Access (E-UTRA); Physical Layer Procedures (Release 10).

\* cited by examiner

| PRIORITY RULE | EXAMPLE 1 | EXAMPLE 2 |
|---|---|---|
| STEP 1 | FEEDBACK TYPE GROUP 1:<br>  TYPE 6, 5, 3 AND 2A<br>FEEDBACK TYPE GROUP 2:<br>  TYPE 2/2B/2C, TYPE 4<br>FEEDBACK TYPE GROUP 3:<br>  TYPE 1A, TYPE 1<br>- PRIORITY ORDER:<br>TYPE GROUP 1 > TYPE GROUP 2 > TYPE GROUP 3 | FEEDBACK TYPE GROUP 1:<br>  TYPE 6, 5, 3 AND 2A<br>FEEDBACK TYPE GROUP 2:<br>  TYPE 2/2B/2C, TYPE 4<br>FEEDBACK TYPE GROUP 3:<br>  TYPE 1A, TYPE 1<br>- PRIORITY ORDER:<br>TYPE GROUP 1 > TYPE GROUP 2 > TYPE GROUP 3 |
| STEP 2 | FEEDBACK MODE GROUP 1:<br>  MODE 1-0, MODE 1-1<br>FEEDBACK MODE GROUP 2:<br>  MODE 2-0, MODE 2-1<br>- PRIORITY ORDER:<br>MODE GROUP 1 > MODE GROUP 2 | NONE |
| STEP 3 | FOLLOW DL CC PRIORITY CONFIGURED BY RRC<br>1. VIA EXPLICIT SIGNALING<br>2. VIA IMPLICIT PRE-DEFINITION | FOLLOW DL CC PRIORITY CONFIGURED BY RRC<br>1. VIA EXPLICIT SIGNALING<br>2. VIA IMPLICIT PRE-DEFINITION |

PRIORITY RULES OF PERIODIC CSI REPORTING IN CARRIER AGGREGATION

CROSS REFERENCE TO RELATED APPLICATIONS

This application claims priority under 35 U.S.C. §119 from U.S. Provisional Application No. 61/442,825, entitled "Priority Rules of periodic CSI Reporting in Carrier Aggregation," filed on Feb. 15, 2011, the subject matter of which is incorporated herein by reference.

TECHNICAL FIELD

The disclosed embodiments relate generally to wireless network communications, and, more particularly, to uplink CSI feedback priority rules for carrier aggregation in mobile communication systems.

BACKGROUND

The use of multiple antennas at both the transmitter and receiver of a wireless communication system along with related baseband signal processing is referred to as Multiple-Input Multiple-Output (MIMO) technology. In a MU-MIMO system, precoding is applied at the transmitter in order to suppress mutual interference experienced by each receiving station caused by transmissions to other receiving stations. To those skilled in the art, MU-MIMO precoding, refers to spatial encoding of the transmitted signal based on propagation channel. In order to apply MU-MIMO precoding, the transmitting station is required to know the Channel State Information (CSI) of the radio channels connecting it to each of the receiving stations for transmission. In 3GPP LTE systems, it is common for the receiving stations (e.g., user equipments) to measure CSI and report CSI to the transmitting station (e.g., eNodeB) via an uplink feedback channel. The content of CSI feedback contains RI (rank indicator), CQI (channel quality indicator), and PMI (precoding matrix indicator) for each downlink component carrier (CC).

In 3GPP LTE systems, CSI reporting is categorized into two types. A first type is called Aperiodic CSI reporting, which applies a triggering mechanism. When triggered, CSI is either reported for all activated downlink CCs, or reported for the downlink CC that is linked to the uplink CC for which the grant containing the trigger is sent. Aperiodic CSI is carried on PUSCH only. A second type is called Periodic CSI reporting, which applies an upper layer (e.g., RRC layer) configuration mechanism. When configured, CSI is reported periodically for one activated downlink CC only. Periodic CSI is carried on PUCCH or PUSCH.

In Rel-8/9 LTE systems, periodic CSI reporting for RI and CQI/PMI is configured separately for a single component carrier. RI reporting is configured by the periodicity $M_{RI}$ and relative offset $M_{OFFSET, RI}$. CQI/PMI reporting is configured by the periodicity $N_P$ and relative offset $N_{OFFSET, CQI}$. When the relative offset values for RI and CQI/PMI reporting are not set perfectly, collision of RI and CQI/PMI may occur for single-carrier cases. In general, the priority rule is that RI is prioritized over CQI/PMI in case of collision. Therefore, when both RI reporting and CQI/PMI reporting are configured at the same time slot, RI reporting is sent and CQI/PMI reporting is dropped by the UE.

In Rel-10 LTE-A systems, carrier aggregation (CA) can support up to five DL CCs so CSI reporting for multiple DL CCs is possible. Periodic CSI reporting, however, is configured for one activated DL CC only, which is reported via the primary uplink CC. There are 10 feedback types and 4 feedback modes defined in Rel-10 LTE-A. It is thus desirable to have a detailed priority rule to decide for which DL CC the configured periodic CSI reporting will be transmitted when there is periodic CSI reporting collision across the multiple DL CCs.

SUMMARY

A method of determining priority rules for periodic CSI reporting in carrier aggregation is proposed. A UE obtains channel state information (CSI) feedback for multiple downlink component carriers (CCs) in a multi-carrier wireless communication network. Each downlink CC is associated with a feedback mode, and each feedback mode comprises a set of feedback types to be reported to a base station at time slots configured by an upper layer. The UE then determines a prioritized downlink CC for CSI reporting based on priority levels of the feedback types to be transmitted for each downlink CC at a given time slot. The UE then transmits the corresponding CSI feedback for the prioritized downlink CC at the given time slot via a feedback channel over a primary uplink CC.

In one embodiment, the UE first checks the priority level of each feedback type to be reported at a given time slot for each downlink CC. If the priority levels of the feedback types are the same among the multiple CCs, then the UE checks the priority level of each feedback mode associated with each downlink CC. If the priority levels of the feedback modes are the same among the multiple CCs, then the UE further checks the priority level of each downlink CC configured by an upper layer (e.g., with pre-defined priority or via RRC messaging). Finally, based on the priority level comparison, the UE determines a prioritized downlink CC for CSI reporting at the given time slot and transmits the corresponding CSI feedback for the prioritized downlink CC.

In 3GPP LTE systems, there are ten feedback types and four feedback modes defined. In one example, the feedback types are prioritized by groups, and each feedback type group has several feedback types sharing the same priority level. Similarly, the feedback modes are also prioritized by groups, and each feedback mode group has one or more feedback modes sharing the same priority level. By comparing priorities of groups of feedback types for each downlink CC, the CSI feedback opportunities are evenly distributed across the multiple CCs without favoring or disfavoring a particular CC.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 lists a few examples of priority rules that may be used for periodic CSI reporting.

DETAILED DESCRIPTION

Reference will now be made in detail to some embodiments of the invention, examples of which are illustrated in the accompanying drawings.

Figure 1:
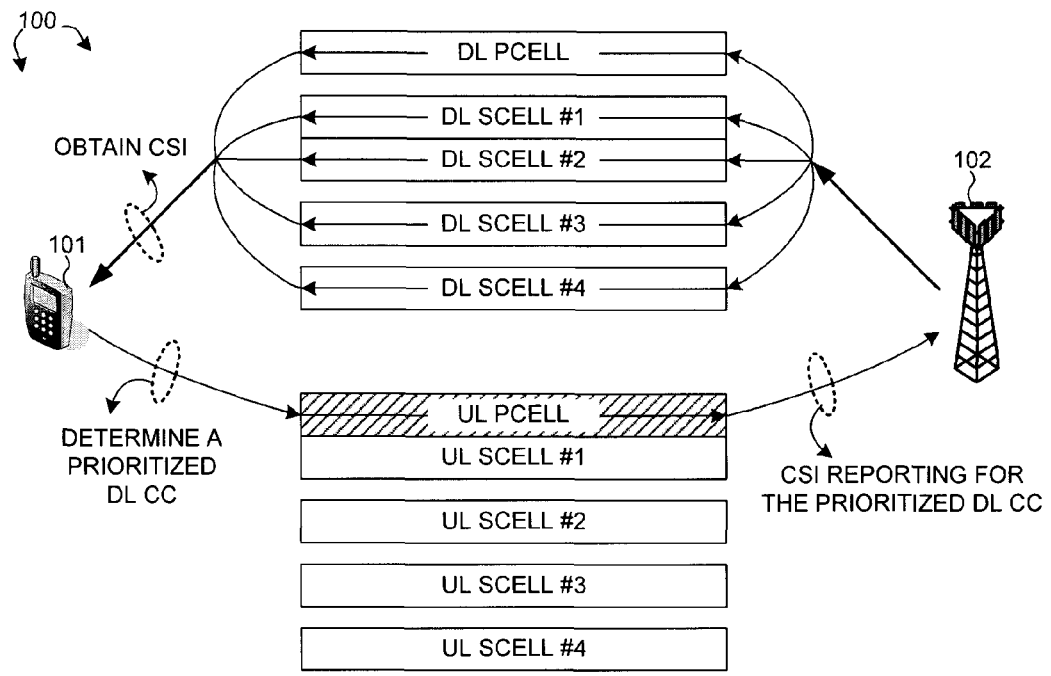
FIG. 1 illustrates priority rules for CSI reporting in a wireless communication system in accordance with one novel aspect.

FIG. 1 illustrates priority rules for channel state information (CSI) reporting in a wireless communication system 100 in accordance with one novel aspect. Wireless communication system 100 comprises a user equipment UE 101 and a serving base station eNodeB 102. In the example of FIG. 1, carrier aggregation (CA) supports five downlink component carriers and five uplink component carriers for each data connection. The downlink component carriers include one primary cell DL PCELL, and four secondary cells DL SCELL #1 to #4. The uplink component carriers include one primary cell UL PCELL, and four secondary cells UL SCELL #1 to #4. If all the five DL CCs and UL CCs are activated, then UE 101 needs to measure CSI and report CSI for each of the activated DL CCs via an uplink feedback channel.

In 3GPP LTE systems, CSI reporting is categorized into two types. A first type is called Aperiodic CSI reporting, which applies a triggering mechanism. When triggered, CSI may be reported for all activated downlink CCs. A second type is called Periodic CSI reporting, which applies an upper layer (e.g., RRC layer) configuration mechanism. When configured, CSI is reported periodically for one activated downlink CC only in any given subframe. If periodic CSI reporting is configured for multiple DL CCs simultaneously, then periodic CSI reporting collision may occur across the multiple DL CCs. This is because the feedback channel for periodic CSI reporting is carried by pre-defined resources over the primary uplink CC. For example, if CSI reporting is configured for DL PCELL, SCELL #1, and SCELL #2 at the same time slot (e.g., in a given subframe), then CSI reporting collision occurs. As a result, CSI reporting is sent for one DL CC, and dropped for the other two CCs.

In one novel aspect, priority rules are defined for periodic CSI reporting for carrier aggregation. First, UE 101 estimates the channel and obtains CSI for each of the activated downlink CCs. Next, based on the priority rules, a prioritized DL CC is determined for CSI reporting when collision occurs across multiple activated DL CCs. Finally, UE 101 transmits CSI feedback for the prioritized DL CC via the uplink feedback channel over the UL PCELL. In general, it is desirable that the priority rules do not favor or disfavor one particular DL CC for CSI reporting. Each activated DL CC is treated as equal as possible and has substantially the same opportunity to report CSI feedback over time.

Figure 2:
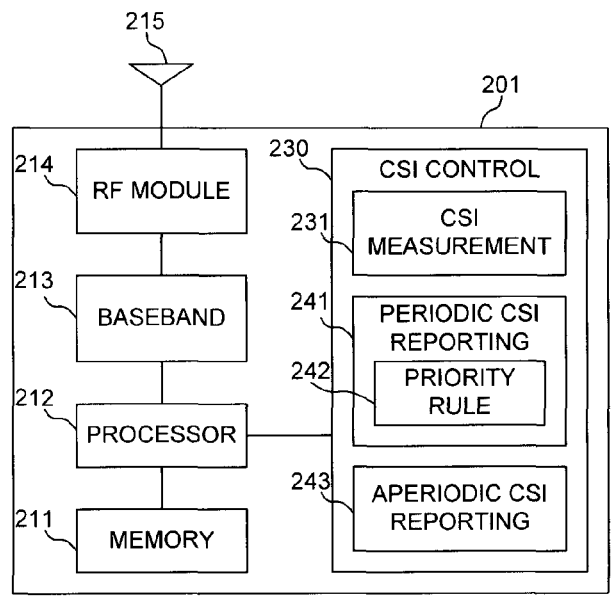
FIG. 2 illustrates a simplified block diagram of a user equipment in accordance with one novel aspect.

FIG. 2 illustrates a simplified block diagram of a user equipment UE 201 in accordance with one novel aspect. UE 201 comprises memory 211, a processor 212, a baseband module 213, a radio frequency (RF) module 214 coupled to an antenna 215. Antenna 215 transmits and receives RF signals. RF module 214 receives RF signals from antenna 215, converts them to baseband signals, and sends them to processor 212. RF module 214 also converts the received baseband signals from processor 212, converts them to RF signals, and sends them out to antenna 215. UE 201 also comprises various function modules to carry out embodiments of the present invention.

In one embodiment, UE 201 comprises a CSI control module 230 that handles CSI measurement and reporting. CSI control module 230 comprises a CSI measurement module 231, a periodic CSI reporting module 241 having a priority rule determination module 242, and an Aperiodic CSI reporting module 243. CSI measurement module 231 performs channel estimation and obtains CSI for each activated downlink CC, periodic CSI reporting module 241 reports periodic CSI based on RRC layer configuration, and Aperiodic CSI reporting module 243 reports aperiodic CSI based on physical downlink control channel (PDCCH) triggering. Processor 132 invokes different function modules to perform functionalities supported by UE 201. Memory 211 stores program instructions and data to control the operation of UE 201. The functional modules may be implemented in software, firmware, hardware, or any combination thereof. The function modules, when executed by the processor, allow UE 201 to report periodic CSI feedback for a specific downlink CC to its serving base station under priority rules determined by periodic rule determination module 242.

Figures 3, 4:
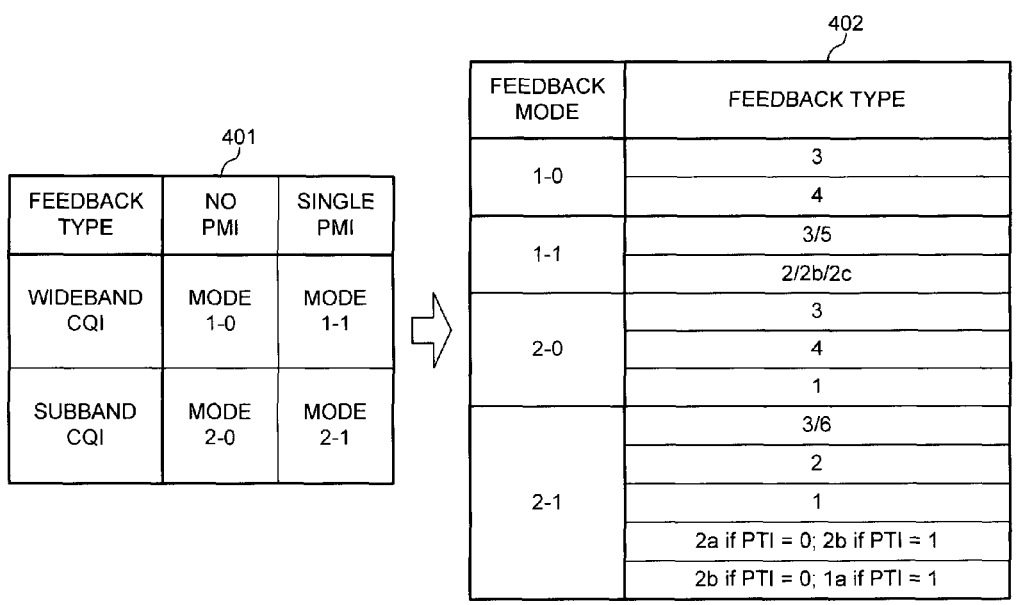
FIG. 3 is a table of different CSI feedback types defined in a 3GPP LTE system.
FIG. 4 illustrates different CSI feedback modes defined in a 3GPP LTE system.

The content of CSI feedback contains PTI (precoder type indication), RI (rank indicator), CQI (channel quality indicator), and PMI (precoding matrix indicator) for each activated DL CC. PTI, RI, CQI, and PMI are the basic CSI information types, together form complete CSI feedback information. Based on the basic CSI information types, different CSI feedback types are defined. FIG. 3 is a table of different CSI feedback types defined in a 3GPP LTE system. In Rel-8/9, four feedback types 1-4 are defined. Feedback type 1 represents subband CQI info, feedback type 2 represents wideband CQI plus PMI info, feedback type 3 represents RI info, and feedback type 4 represents wideband CQI info.

In Rel-10, six more feedback types 1$a$, 2$a$/2$b$/2$c$, 5, and 6 are defined. Feedback type 1$a$ represents subband CQI plus subband second PMI info, feedback type 2$a$ represents wideband first PMI info, feedback type 2$b$ represents wideband CQI plus wideband second PMI info, feedback type 2$c$ represents wideband CQI, wideband first PMI and wideband second PMI info, feedback type 5 represents RI plus first PMI info, and feedback type 6 represents RI plus PTI info. The different feedback types are defined so that the eNodeB can flexibly configure CSI information to be reported by the UE via pre-defined radio resources over the feedback channel at different time slots. For example, the feedback channel contains a pre-defined number of bits (e.g., twelve bits) at a given time slots periodically, and each of the feedback types can be efficiently carried by the pre-defined number of bits.

In order for the eNodeB to receive complete CSI feedback information, different CSI feedback modes are defined. FIG. 4 illustrates different CSI feedback modes defined in a 3GPP LTE system. Table 401 of FIG. 4 illustrates the relationship between feedback modes and feedback types. For example, feedback mode 1-0 indicates wideband CQI and no PMI, feedback mode 1-1 indicates wideband CQI with single PMI, feedback mode 2-0 indicates subband CQI and no PMI, and feedback mode 2-1 indicates subband CQI and single PMI. Table 402 of FIG. 4 illustrates the detailed feedback types defined for each feedback mode. Feedback mode 1-0 contains feedback types 3 and 4, feedback mode 1-1 contains feedback types 3/5 and 2/2$b$/2$c$, feedback mode 2-0 contains feedback types 3, 4, and 1, and feedback mode 2-1 contains feedback types 3/6, 2, 1, 2$a$(2$b$), and 2$b$(1$a$) (e.g., 2$a$ and 2$b$ if PTI=0; or 2$b$ and 1$a$ if PTI=1). For each feedback mode, its defined feedback types are reported at different time slots so that the eNodeB receives complete CSI feedback information over time. For example, for feedback mode 1-0, feedback type 3 (RI) and feedback type 4 (wideband CQI) are reported at different time slots to the eNodeB.

The feedback mode is linked to MIMO transmission mode (TM). Nine transmission modes are defined in 3GPP LTE systems. Transmission modes 1-3 and 7 are associated with feedback modes 1-0 and 2-0, where no PMI is required for CSI feedback. Transmission modes 4-6 are associated with feedback modes 1-1 and 2-1, where single PMI is required for CSI feedback. Transmission mode 8 is associated with feedback modes 1-1 and 2-1 if the UE is configured with PMI/RI reporting, or modes 1-0 and 2-0 if the UE is configured without PMI/RI reporting. Transmission mode 9 is associated with feedback modes 1-1 and 2-1 if the UE is configured with PMI/RI reporting and the number of CSI-RS ports is greater than one, or modes 1-0 and 2-0 if the UE is configured without PMI/RI reporting or the number of CSI-RS ports is equal to one.

For periodic CSI reporting, each of the activated downlink CC is configured with a specific feedback mode, based on the MIMO transmission mode applied for that DL CC. Because MIMO transmission mode does not change dynamically for every subframe, its corresponding feedback mode is semi-statically configured by upper layer RRC. On the other hand, because the different feedback types within each feedback mode are reported at different subframes, each feedback type is dynamically configured at different subframes. Based on this characteristic, the priority rules are determined to first follow the feedback type priority, and optionally follow the feedback mode priority if the feedback type priority is the same. If the feedback type (and the feedback mode) priority is the same, then follow RRC layer configuration. Furthermore, the different feedback types are prioritized into groups. Within each feedback type group, there are several feedback types sharing the same priority. By using such priority rules for CSI reporting, each activated DL CC gets substantially equal opportunity for CSI reporting over time, without favor/disfavor any particular DL CC.

Figure 5:
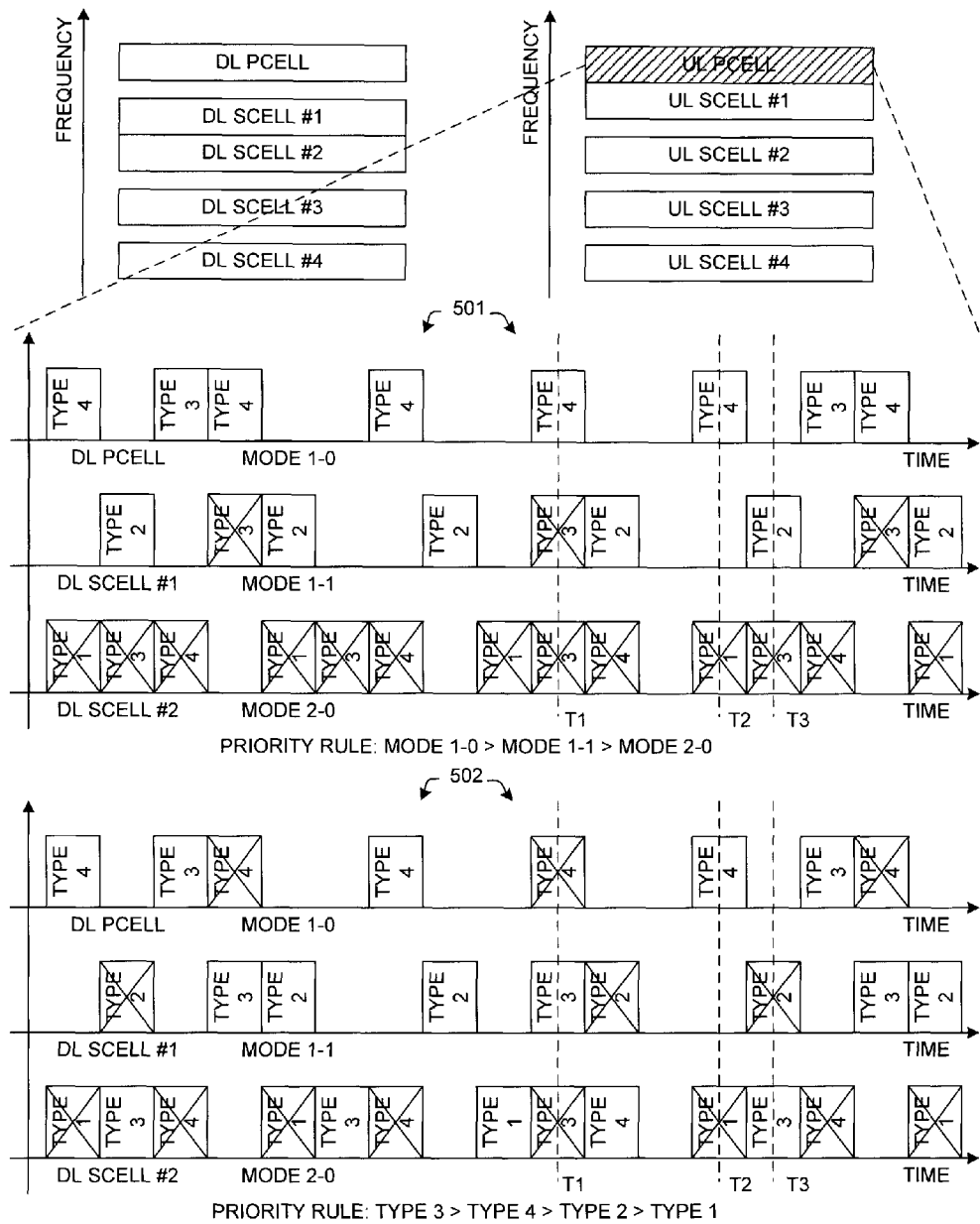
FIG. 5 illustrates one embodiment of priority rules for CSI reporting.

FIG. 5 illustrates one embodiment of priority rules for CSI reporting. In the example of FIG. 5, a UE and its serving eNodeB communicate with each other over five downlink component carriers (e.g., DL PCELL and DL SCELL #1-#4) and five uplink component carriers (e.g., UL PCELL and UL SCELL #1-$4). Three of the downlink CCs (e.g., DL PCELL, DL SCELL #1, and DL SCELL #2) are activated, and CSI feedback reporting is configured for each of the three activated DL CCs via UL PCELL. For DL PCELL, feedback mode 1-0 is applied, where feedback types 3 and 4 are configured for periodic CSI reporting. For DL SCELL #1, feedback mode 1-1 is applied, where feedback types 2 and 3 are configured for periodic CSI reporting. For DL SCELL #2, feedback mode 2-0 is applied, where feedback types 1, 3, and 4 are configured for periodic CSI reporting. Two-dimensional diagrams are used in FIG. 5 to illustrate how periodic CSI feedback reporting is determined based on different priority rules, with the vertical dimension represents the frequency domain (e.g., the CCs) and the horizontal dimension represents the time domain (e.g., the time slots).

In a first example, a two-dimensional diagram 501 illustrates a priority rule based on feedback mode, e.g., priority of feedback mode 1-0>mode 1-1>mode 2-0. It can be seen that under such priority rule, DL PCELL always has higher priority than DL SCELL #1, which has higher priority than DL SCELL #2, because of the associated feedback mode. For example, at time slot T1, DL PCELL is selected as the prioritized CC for CSI reporting. The UE will send feedback type 4 for DL PCELL, and will drop feedback type 3 that is configured for both DL SCELL #1 and DL SCELL #2 (e.g., depicted by cross-out signs). Similarly, at time slot T2, the UE will send feedback type 4 for DL PCELL, and will drop feedback type 1 that is configured for DL SCELL #2. At time slot T3, DL SCELL #1 is selected as the prioritized CC for CSI reporting. The UE will send feedback type 2 for DL SCELL #1, and will drop feedback type 3 that is configured for DL SCELL #2. As a result, CSI reporting is always first favored for DL PCELL, then for DL SCELL #1, and disfavored for DL SCELL #2. Without proper CSI reporting to the eNodeB, it will cause performance degradation for DL MIMO for those DL CCs, e.g., DL SCELL #2.

In a second example, a two-dimensional diagram 502 illustrates a better-designed priority rule based on feedback type, e.g., priority of feedback type 3>type 4>type 2>type 1. When feedback types are the same, then priority is further determined by RRC configuration (e.g. based on CC index). It can be seen that under such priority rule, each of the three DL CCs has almost the same priority as compared to the other two DL CCs at any given time slot, because different feedback types are configured for different DL CCs at different time slots, at a randomly dynamic fashion. For example, at time slot T1, the UE will send feedback type 3 for DL SCELL #1, and will drop feedback type 4 that is configured for DL PCELL and feedback type 3 for DL SCELL #2 (e.g., further determined based on CC index). At time slot T2, the UE will send feedback type 4 for DL PCELL, and will drop feedback type 1 that is configured for DL SCELL #2. Finally, at time slot T3, the UE will send feedback type 3 for DL SCELL #2, and will drop feedback 2 that is configured for DL SCELL #1. As a result, a different DL CC is selected as the prioritized CC for CSI reporting at a different time slot, and CSI reporting opportunity is evenly distributed among the three DL CCs.

From the above illustration, it is proposed that for periodic CSI reporting, priority order shall be based on feedback type and RRC configuration. First, the UE follows the feedback type priority to determine a prioritized CC. Second, if feedback type priority is the same, then the UE follows RRC configuration. In one example, the UE may receive a priority rule via explicit RRC signaling message. In another example, the UE may follow a priority rule implicitly predefined by RRC. On the other hand, priority based on feedback mode is optional. Since feedback mode is semi-statically configured and linked to transmission mode, priority based on feedback mode can result in long occupancy of periodic CSI reporting opportunities favored for a specific DL CC. In addition, some feedback modes share the same feedback types so there is not much meaning to decide the priority based on feedback mode. For example, feedback mode 1-0 consists of feedback types 3 and 4, while feedback mode 2-0 consists of feedback types 3, 4, and 1. As illustrated by the 2D diagram 502 of FIG. 5, feedback opportunities are already evenly distributed across different DL CCs, without involving priority based on feedback mode.

Figure 6:
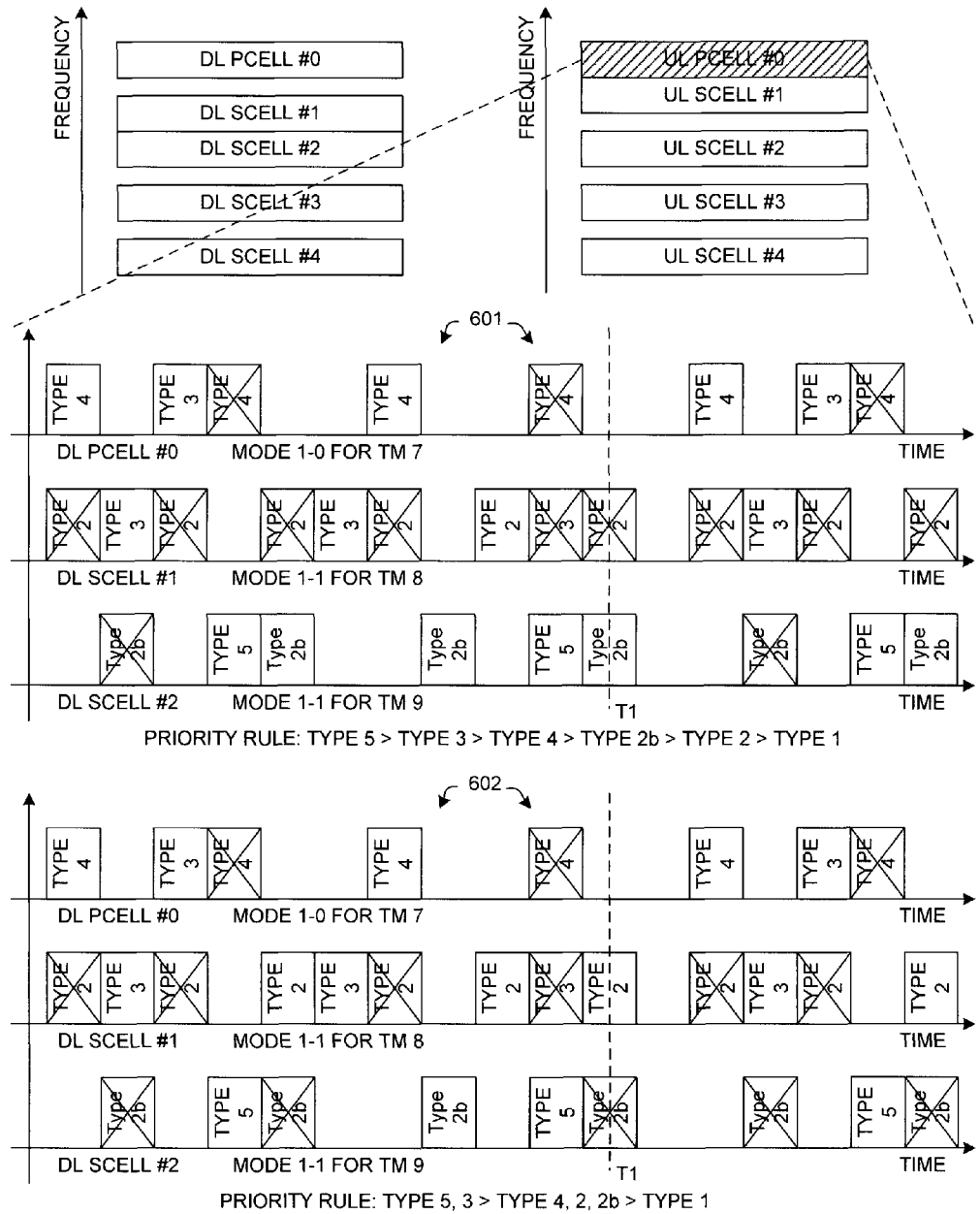
FIG. 6 illustrates another embodiment of priority rules for CSI reporting.

FIG. 6 illustrates another embodiment of priority rules for CSI reporting. Similar to FIG. 5, a UE and its serving eNodeB communicate with each other over five downlink component carriers (e.g., DL PCELL and DL SCELL #1-#4) and five uplink component carriers (e.g., UL PCELL and UL SCELL #1-$4). In the example of FIG. 6, three of the downlink CCs DL PCELL, DL SCELL #1, and DL SCELL #2 are activated, and CSI feedback reporting is configured for each of the three CCs via UL PCELL. For DL PCELL, feedback mode 1-0 for TM7 is applied for periodic CSI reporting, where feedback 3 and feedback 4 are configured. For DL SCELL #1, feedback mode 1-1 for MT8 is applied for periodic CSI reporting, where feedback type 2 and feedback type 3 are configured. For DL SCELL #2, feedback mode 1-1 for TM9 is applied for CSI reporting, where feedback type 2*b* and feedback type 5 are configured.

In a first example, a two-dimensional diagram 601 illustrates a priority rule based on feedback type, e.g., priority of feedback type 5>type 3>type 4>type 2b>type 2>type 1. When feedback types are the same, then priority is determined by RRC configuration (e.g. based on CC index). It can be seen that under such priority rule, DL SCELL #2 is more favored than DL SCELL #1 for CSI reporting, because feedback type 2b has a higher priority than feedback type 2. For example, at time slot T1, the UE will send feedback type 2b for DL SCELL #2, and drop feedback type 2 that is configured for DL SCELL #1. In fact, TM9 (transmission mode 9) is newly defined in LTE Rel-10 with newly defined feedback type 2b. Therefore, if the priority rule favors feedback type 2b than feedback type 2, then in some situations CCs configured with TM9 will get higher chances to get periodic CSI reporting opportunities.

In a second example, a two-dimensional diagram 602 illustrates a better-designed priority rule based on feedback type groups. Different feedback types are first prioritized into groups, each group having one or more feedback types sharing the same priority. When feedback type groups are the same, then priority is determined by RRC configuration (e.g. based on CC index). As illustrated by diagram 602, priority of feedback type group (type 5, 3)>group (type 4, 2, 2b)>group (type 1). It can be seen that prioritizing feedback types by groups can avoid the preference to a specific transmission mode, which is configured semi-statically. For example, at time slot T1, feedback type 2 is configured for DL SCELL #1 while feedback type 2b is configured for DL SCELL #2. Because feedback types 2 and 2b belong to the same feedback type group sharing the same priority, the UE will then choose DL SCELL #1 as the prioritized CC for CSI reporting because it has a lower CC index. In some exemplary embodiments, the feedback types can be organized into groups based on CSI information types, for example, the priority of PTI>=RI>CQI>PMI.

The priority rules for periodic CSI reporting may be enhanced based on aperiodic CSI reporting. In Rel-10 LTE-A systems, several feedback modes do not exist in aperiodic CSI reporting. Aperiodic CSI reporting can be triggered to enhance the insufficiency of periodic CSI reporting, especially when CSI are dropped due to the collision across multiple DL CCs. However, for those feedback modes that do not exist in aperiodic CSI reporting, they cannot be recovered by triggering aperiodic CSI reporting if they are dropped. Therefore, for these feedback modes that do not have aperiodic CSI reporting, periodic CSI reporting is prioritized over others.

FIG. 7 lists a few examples of priority rules that may be used for periodic CSI reporting in an LTE system. For a UE configured with more than one serving cell, the UE transmits a CSI report of only one serving cell in any given subframe. For a given subframe, in case of collision of CSI report, the UE selects a prioritized serving cell based on the priority rules. In Example #1, feedback type priority is first checked in step 1. The ten feedback types are grouped into three groups based on the CSI information types. In this particular example, feedback type group #1 consists of feedback types 6, 5, 3, and 2a, feedback type group #2 consists of feedback types 2, 2b, 2c, and 4, and feedback group type #3 consists of feedback types 1 and 1a. The priority order is feedback type group #1>type group #2>type group #3. If the feedback types have the same priority, then feedback mode priority is checked in step 2. The four feedback modes are grouped into two groups. Feedback mode group #1 consists of feedback modes 1-0 and 1-1, and feedback mode group #2 consists of feedback modes 2-0 and 2-1. The priority order is feedback mode group #1>mode group #2. If the feedback modes also have the same priority, then the priority of each DL CC is checked. The DL CC priority is configured by RRC layer, for example, the DL CC the lowest cell index has the highest priority. The upper layer priority rule may be configure via an explicit RRC signaling message, or may be implicitly pre-defined.

Figure 8:
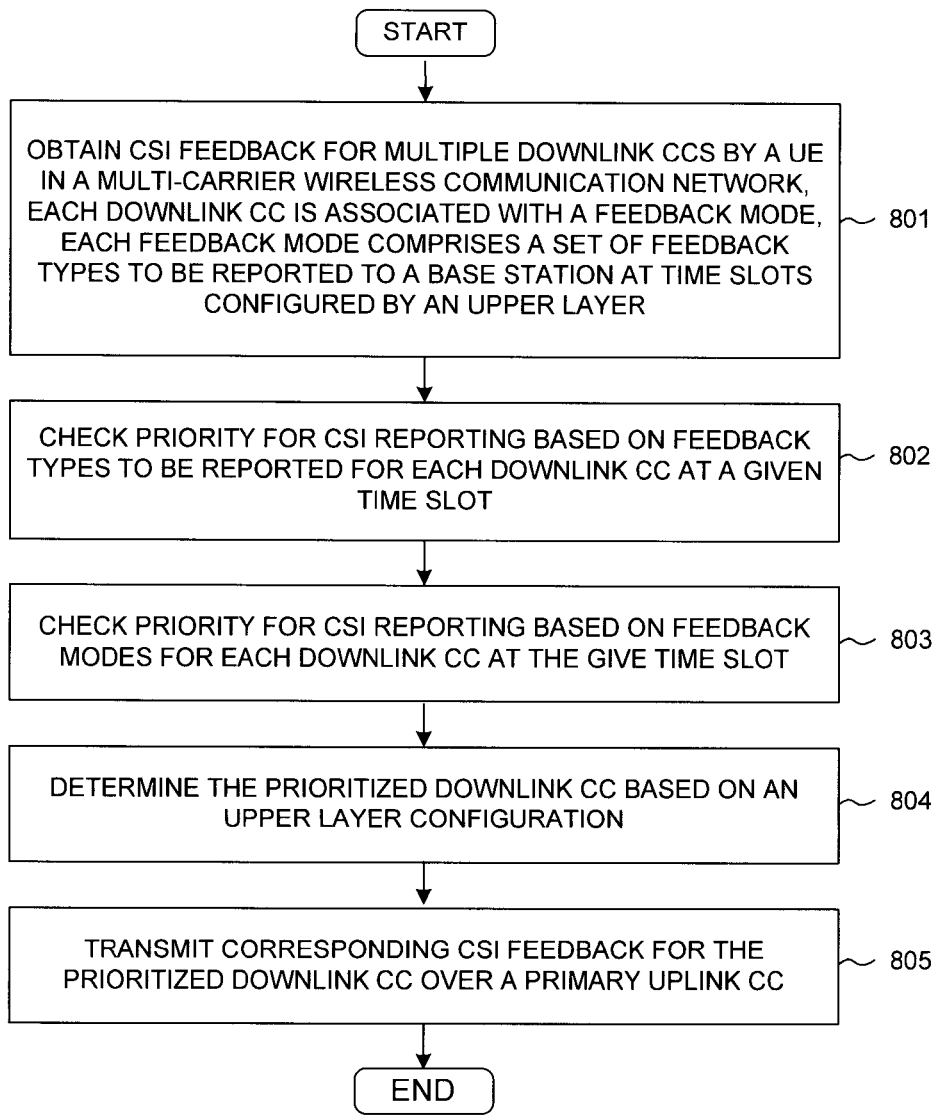
FIG. 8 is flow chart of a method of determining priority rules for CSI reporting in accordance with one novel aspect.

FIG. 8 is flow chart of a method of determining priority rules for CSI reporting in accordance with one novel aspect. In step 801, a UE obtains CSI feedback for multiple downlink CCs in a multi-carrier wireless communication network. Each downlink CC is associated with a feedback mode, and each feedback mode comprises a set of feedback types to be reported to a base station at time slots configured by an upper layer. In step 802, the UE checks the priority level of each feedback type to be reported at a given time slot for each downlink CC. In one example, different feedback types are prioritized into groups, each group has several feedback types sharing the same priority level. In step 803, if the priority levels of the feedback types are the same among the multiple CCs, then the UE checks the priority level of each feedback mode associated with each downlink CC. In one example, different feedback modes are prioritized into groups, each group has one or more feedback modes sharing the same priority level. In step 804, if the priority levels of the feedback modes are the same among the multiple CCs, then the UE further checks the priority level of each downlink CC configured by an upper layer (e.g., with pre-defined priority or via RRC messaging). Finally, in step 805, based on the priority level checking, the UE determines a prioritized downlink CC for CSI reporting at the given time slot and transmits the corresponding CSI feedback for the prioritized downlink CC.

Although the present invention has been described in connection with certain specific embodiments for instructional purposes, the present invention is not limited thereto. For example, although an LTE-advanced mobile communication system is exemplified to describe the present invention, the present invention can be similarly applied to all carrier aggregation-based mobile communication systems. Accordingly, various modifications, adaptations, and combinations of various features of the described embodiments can be practiced without departing from the scope of the invention as set forth in the claims.

What is claimed is:

1. A method comprising:
   obtaining channel state information (CSI) feedback for multiple downlink component carriers (CCs) by a user equipment (UE) in a multi-carrier wireless communication network, wherein each downlink CC is associated with a feedback mode, and wherein each feedback mode comprises a set of feedback types to be reported to a base station at time slots configured by an upper layer;
   determining a prioritized downlink CC for CSI reporting based on feedback types and feedback modes to be transmitted for each downlink CC at a given time slot, wherein different feedback types are organized into feedback type groups based on CSI information types, wherein multiple feedback types within the same feedback type group share the same priority level, wherein different feedback modes are organized into feedback mode groups based on transmission modes, and wherein multiple feedback modes within the same feedback mode group share the same priority level; and
   transmitting corresponding CSI feedback for the prioritized downlink CC over a primary uplink CC.

2. The method of claim 1, wherein each feedback mode is semi-statically configured by the upper layer and linked to a MIMO transmission mode.

3. The method of claim 1, wherein different feedback types are organized into the feedback type groups based on CSI information types including precoding type indicator, rank indication, channel quality indicator, precoder matrix indicator and the combinations.

4. The method of claim 1, wherein each feedback type is periodically reported to the base station, and wherein each set of feedback types for corresponding downlink CC form complete CSI feedback information.

5. The method of claim 1, wherein a first feedback type is supported by aperiodic reporting, wherein a second feedback type is not supported by aperiodic reporting, and wherein the first feedback type has a lower priority level than the second feedback type in periodic CSI reporting.

6. The method of claim 1, wherein the prioritized downlink CC is further determined based on an upper layer configuration if the feedback types have the same priority level.

7. The method of claim 6, wherein the upper link configuration includes defining a priority rule that is explicitly signaled or implicitly predefined.

8. A user equipment (UE), comprising:
a channel state information (CSI) measurement module that obtains CSI feedback for multiple downlink component carriers (CCs) by a user equipment (UE) in a multi-carrier wireless communication network, wherein each downlink CC is associated with a feedback mode, and wherein each feedback mode comprises a set of feedback types to be reported to a base station at time slots configured by an upper layer;
a periodic-CSI reporting module that determines a prioritized downlink CC for CSI reporting based on feedback types and feedback modes to be transmitted for each downlink CC at a given time slot, wherein different feedback types are organized into feedback type groups based on CSI information types, wherein multiple feedback types within the same feedback type group share the same priority level, wherein different feedback modes are organized into feedback mode groups based on transmission modes, and wherein multiple feedback modes within the same feedback mode group share the same priority level; and
a radio frequency module that transmits corresponding CSI feedback for the prioritized downlink CC over a primary uplink CC.

9. The UE of claim 8, wherein each feedback mode is semi-statically configured by the upper layer and linked to a MIMO transmission mode.

10. The UE of claim 8, wherein different feedback types are organized into the feedback type groups based on CSI information types including precoding type indicator, rank indication, channel quality indicator, precoder matrix indicator and the combinations.

11. The UE of claim 8, wherein each feedback type is periodically reported to the base station, and wherein each set of feedback types for corresponding downlink CC form complete CSI feedback information.

12. The UE of claim 8, wherein a first feedback type is supported by aperiodic reporting, wherein a second feedback type is not supported by aperiodic reporting, and wherein the first feedback type has a lower priority level than the second feedback type in periodic CSI reporting.

13. The UE of claim 8, wherein the prioritized downlink CC is further determined based on an upper layer configuration if the feedback types have the same priority level.

14. The UE of claim 13, wherein the upper link configuration includes defining a priority rule that is explicitly signaled or implicitly predefined.

15. A user equipment (UE), comprising:
a processor; and
a memory comprising a program that, when executed by the processor, causes the processor to perform operations comprising:
obtaining channel state information (CSI) feedback for multiple downlink component carriers (CCs) by the user equipment (UE) in a multi-carrier wireless communication network, wherein each downlink CC is associated with a feedback mode, and wherein each feedback mode comprises a set of feedback types to be reported to a base station at time slots configured by an upper layer;
determining priority rules for CSI feedback reporting based at least in part on feedback types to be transmitted for each downlink CC at a given time slot, wherein different feedback types are organized into feedback type groups based on CSI information types, wherein multiple feedback types within the same feedback type group share the same priority level, wherein different feedback modes are organized into feedback mode groups based on transmission modes, and wherein multiple feedback modes within the same feedback mode group share the same priority level; and
transmitting CSI feedback for a prioritized downlink CC using a primary uplink CC.

16. The UE of claim 15, wherein each feedback mode is semi-statically configured by the upper layer and linked to a MIMO transmission mode.

17. The UE of claim 15, wherein different feedback types are organized into the feedback type groups based on CSI information types including precoding type indicator, rank indication, channel quality indicator, precoder matrix indicator and the combinations.

18. The UE of claim 17, wherein the prioritized downlink CC is determined such that each of the multiple downlink CCs has substantially equal opportunity to report CSI feedback.

19. The UE of claim 15, wherein each feedback type is periodically reported to the base station, and wherein each set of feedback types for corresponding downlink CC form complete CSI feedback information.

20. The UE of claim 15, wherein a first feedback type is supported by aperiodic reporting, wherein a second feedback type is not supported by aperiodic reporting, and wherein the first feedback type has a lower priority level than the second feedback type in periodic CSI reporting.

21. The UE of claim 15, wherein the prioritized downlink CC is further determined based on an upper layer configuration if the feedback types have the same priority level.

22. The UE of claim 21, wherein the upper link configuration includes defining a priority rule that is explicitly signaled or implicitly predefined.

* * * * *